United States Patent
Morris (10) Patent No.: US 11,940,050 B2
(45) Date of Patent: Mar. 26, 2024

(54) SEAL FOR AN AXLE SHAFT ASSEMBLY

(71) Applicant: Allison Transmission, Inc., Indianapolis, IN (US)

(72) Inventor: Austin Morris, Avon, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 17/837,400

(22) Filed: Jun. 10, 2022

(65) Prior Publication Data

US 2023/0400099 A1 Dec. 14, 2023

(51) Int. Cl.
*F16J 15/3232* (2016.01)

(52) U.S. Cl.
CPC ................. *F16J 15/3232* (2013.01)

(58) Field of Classification Search
CPC .... F16J 15/00; F16J 15/16; F16J 15/50; F16J 15/52; F16J 15/162; F16J 15/3216; F16J 15/322; F16J 15/3224; F16J 15/3228; F16J 15/3232; F16J 15/3236
USPC ........................................................ 277/562
See application file for complete search history.

(56) References Cited

U.S. PATENT DOCUMENTS

| | | | |
|---|---|---|---|
| 4,413,829 A | 11/1983 | Pietsch | |
| 6,325,383 B1 * | 12/2001 | Kahle | F16J 15/3224 277/560 |
| 7,963,526 B2 | 6/2011 | Dahlheimer | |
| 10,865,834 B2 | 12/2020 | Kamiya | |
| 2013/0001890 A1 * | 1/2013 | Denton | F16J 15/3252 277/571 |
| 2017/0184203 A1 | 6/2017 | Matczak | |
| 2019/0226584 A1 | 7/2019 | Cabaj | |
| 2020/0224771 A1 * | 7/2020 | Snell | F16J 15/4472 |

FOREIGN PATENT DOCUMENTS

| | | |
|---|---|---|
| DE | 20109562 U1 | 6/2002 |
| DE | 102019210136 A1 | 1/2021 |
| EP | 51170 A1 | 5/1982 |
| WO | 2020250577 A1 | 12/2020 |

* cited by examiner

*Primary Examiner* — Nathan Cumar
(74) *Attorney, Agent, or Firm* — Faegre Drinker Biddle Reath LLP (57) ABSTRACT

A seal for an axle shaft assembly which may be found in an automotive transmission or drive axle, is provided. The seal may accommodate significant axle deflection, while retaining a fluid-tight seal between multiple sealing surfaces. The seal may include dynamic flanges configured to seal against surfaces which are angled or orthogonal with respect to one another. The seal may also include one or more holes extending from an outer surface to an inner surface of the seal, such that a body of the seal forms a conduit which allows fluid, such as lubricating fluid, to flow through the seal.

19 Claims, 7 Drawing Sheets

SEAL FOR AN AXLE SHAFT ASSEMBLY

TECHNICAL FIELD

The present application relates generally to seals, and more specifically, to seals that may be used with axle shaft assemblies, such as axle shaft assemblies of drive axles.

BACKGROUND

Seals may be used in a variety of contexts. In some examples, seals may be used in axle shaft assemblies to contain lubricant between an output shaft and an axle shaft.

SUMMARY

Aspects of the present disclosure relate generally to a seal, such as a seal for an axle shaft assembly which may be found in an automotive transmission. The seal may accommodate significant axle deflection, while retaining a fluid-tight seal between multiple sealing surfaces. The seal may include dynamic flanges configured to seal against surfaces which are angled or orthogonal with respect to one another. The seal may also include one or more holes extending from an outer surface to an inner surface of the seal, such that a body of the seal forms a conduit which allows fluid, such as lubricating fluid, to flow through the seal.

In some examples, a seal is disclosed. The seal include a body, a first dynamic flange, and a second dynamic flange. The body defines an axis of rotation. A first plane extends parallel to the axis of rotation, and coincident with the axis of rotation. The first dynamic flange protrudes outward from the body. A face of the first dynamic flange forms an annular surface configured to abut against an axle shaft, when assembled therewith. A second dynamic flange protrudes outward from the body. A face of the second dynamic flange forms a second plane against an output shaft, when assembled therewith. Tangent planes defined by the annular surface are substantially orthogonal to the second plane, and the first plane.

In some examples, a seal is disclosed. The seal includes a body, a first dynamic flange, and a second dynamic flange. The body defines an axis of rotation. The body includes an outer circumferential surface and an inner circumferential surface. The first dynamic flange protrudes outward from the body. The second dynamic flange protrudes outward from the body. One or more holes extend from the outer circumferential surface to the inner circumferential surface. The body forms a conduit for fluid to pass therethrough, via the one or more holes.

In some examples, an axle shaft assembly is disclosed. The assembly includes an output shaft, an axle shaft, a seal, a shaft guard, and a housing cover. The output shaft forms a hole extending therethrough. The axle shaft extends through the hole. The seal is in contact with the output shaft and the axle shaft. The shaft guard is in contact with the seal. The housing cover is press fit against the seal and configured to hold the seal against the axle shaft.

In some examples, the first dynamic flange forms an accordion fold.

In some examples, the body defines an outer circumferential surface and an inner circumferential surface. Further, one or more holes extend from the outer circumferential surface to the inner circumferential surface.

In some examples, the one or more holes are a plurality of holes. Further, the body forms a conduit for fluid to pass therethrough, via the plurality of holes.

In some examples, the body includes a first component, a second component, and a third component that are coupled together.

In some examples, the third component includes a notch that is configured to receive a rim of the second component.

In some examples, the first dynamic flange includes a plurality of folds. A ratio of a thickness of a first fold to a thickness of a second fold is between about 0.10 and about 0.70. The thicknesses are measured radially with respect to the axis of rotation.

In some examples, the body forms an outer circumferential surface. The outer circumferential surface bends away from the axis of rotation to form a step.

In some examples, the rim of the second component is a first rim, and the second component further includes a second rim. The first and second rims are laterally opposed with respect to the inner and outer circumferential surfaces.

In some examples, the output shaft is configured to rotate about the axle shaft. The axle shaft defines a central axis about which the axle shaft is configured to rotate. Further, the seal is configured to remain rotationally stationary, with respect to the central axis.

In some examples, the seal includes a first dynamic flange that contacts the output shaft.

In some examples, the seal further includes a second dynamic flange that contacts the axle shaft.

In some examples, the housing cover includes a channel extending therethrough, and the seal include one or more seal holes extending therethrough. The channel and the one or more seal holes, in combination, form a conduit for fluid to pass therethrough.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Corresponding reference characters may indicate corresponding parts throughout the several views. Unless stated otherwise the drawings are proportional and drawn to scale.

DETAILED DESCRIPTION OF THE DRAWINGS

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

While the structures and components disclosed herein may be embodied in many different forms, several specific embodiments are discussed herein with the understanding that the embodiments described in the present disclosure are to be considered only exemplifications of the principles described herein, and the disclosure is not intended to be limited to the embodiments illustrated. Further, throughout the disclosure, the terms "about", "substantially", and "approximately" mean plus or minus 5% of the number or geometric constraint that each term precedes. For example, about 100 may mean 100+/5. Additionally, or alternatively, substantially orthogonal may mean that any 90 degree angle related to the described orthogonality may be between 85.5 degrees and 94.5 degrees (inclusive).

As mentioned above, seals may be used in a variety of contexts. In one specific example, seals may be used in axle shaft assemblies, such as axle shaft assemblies of automotive transmissions, to contain lubricant between an output shaft and an axle shaft. However, axle shafts may deflect when rotating at high speeds, thereby making it difficult to contain lubricant. Further, it may be difficult to pass lubricant into space between the output shaft and the axle shaft. Specifically, with a parallel axis gear scheme, seals may be unable to redirect a flow of lubrication at 90 degrees down a shaft to a differential.

Accordingly, there exists a need to direct oil through a seal from a first direction (e.g., a radial direction with respect to an axle shaft) to a second direction (e.g., an axial direction with respect to an axle shaft) to transfer lubrication between two parts that are moving with respect to each other (e.g., an output shaft that is rotating about an axle shaft). Further, there exists a need to provide a seal around an axle shaft with relatively high tolerance for eccentricity and/or relatively high deflection.

It is with respect to these and other general considerations that embodiments have been described. Also, although relatively specific problems have been discussed, it should be understood that the embodiments should not be limited to solving the specific problems identified herein.

Some seals for axle shafts may accommodate relatively small deflections of the shaft while rotating, such as deflections of about 0.2 millimeters. However, such seals may be unable to accommodate relatively larger eccentricities of shafts and/or relatively large shaft deflections, such as deflections of about 1.2 millimeters. Such relatively large deflections may be caused by static and dynamic vehicle loads.

Aspects of the present disclosure can be advantageous to address the above problems, as well as additional problems that may be recognized by those of ordinary skill in the art. Generally, as explained herein, the present disclosure provides a seal, such as, for example, a seal for an axle shaft assembly. A seal made in accordance with the present disclosure facilitates effective containment of lubricant, even when an axle shaft may substantially deflect. The seal may include a first dynamic flange that contacts a first rotating body (e.g., an axle shaft) and a second dynamic flange that contacts a second rotating body (e.g., an output shaft). The seal may further include a body that includes an outer circumferential surface and an inner circumferential surface. One or more holes may extend from the outer circumferential surface to the inner circumferential surface, such that the body forms a conduit for fluid to pass therethrough, via the one or more holes.

Figure 1:
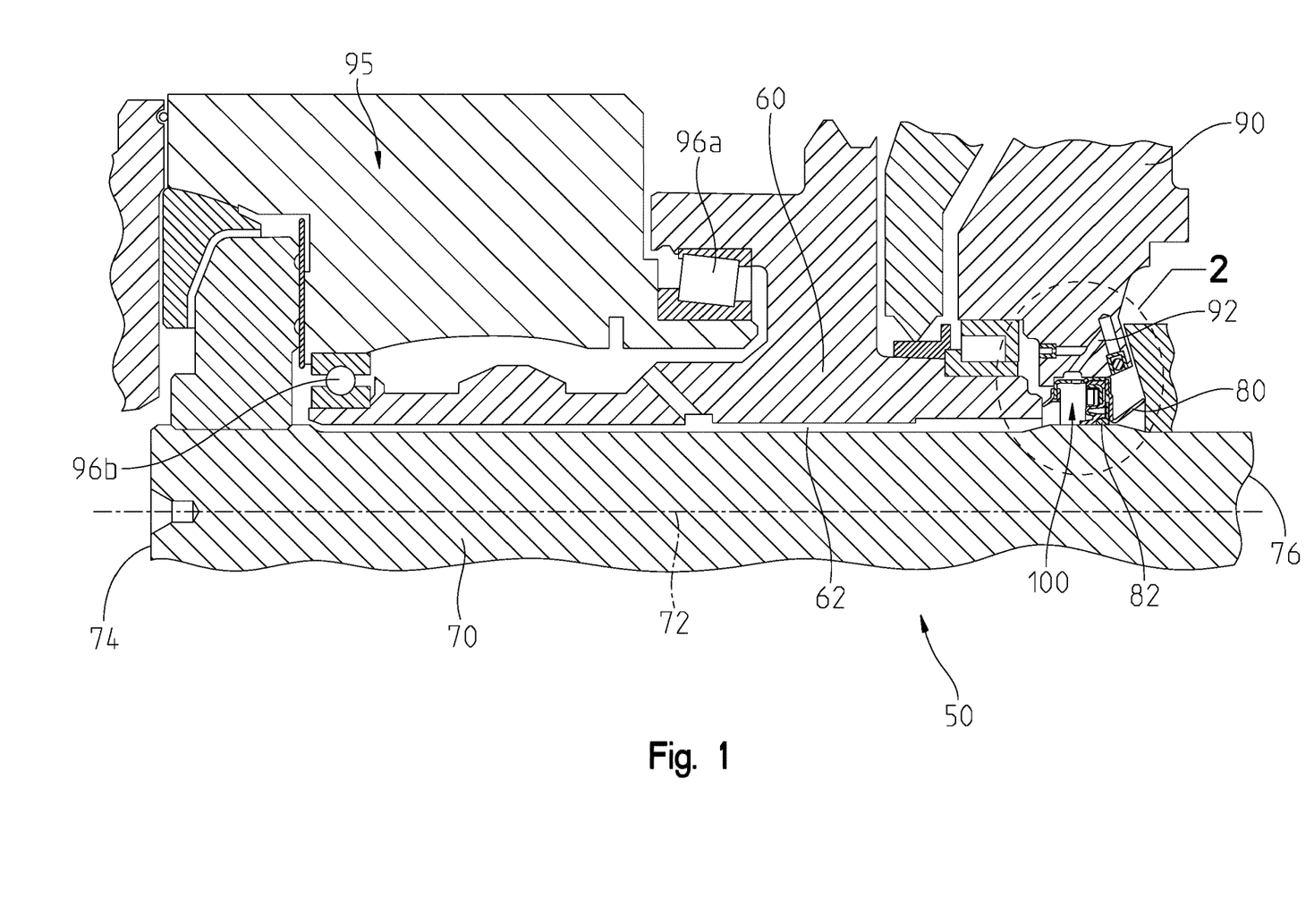
FIG. 1 illustrates a front cross-sectional elevation view of an axle shaft assembly, according to some aspects described herein.

FIG. 1 illustrates a front cross-sectional view of an axle shaft assembly 50. The axle shaft assembly 50 includes an output shaft 60, an axle shaft 70, a shaft guard or guard 80, a housing cover or cover 90, and a seal 100. Additional and/or alternative components that may be included in an axle shaft assembly may be recognized by those of ordinary skill in the art, such as bearings, hubs and transmission components.

The output shaft 60 may form an output shaft bore or void 62 extending therethrough. The axle shaft 70 may extend through the void 62. The seal 100 may be in contact with the output shaft 60 and the axle shaft 70. The seal 100 may further be in contact with the housing cover 90 and/or the shaft guard 80. In all instances of contact between the seal 100 and adjacent structures such as axle shaft 70 and shaft guard 80, a direct abutting contact may be implied, as shown in FIG. 1.

The output shaft 60 may be configured to rotate about the axle shaft 70. The axle shaft 70 defines a central axis 72. The central axis 72 extends longitudinally through the axle shaft 70 from a first end 74 of the axle shaft 70 to a second end 76 of the axle shaft 70. Specifically, the central axis 72 may extend from a center point (e.g., the geometric center point) of the first end 74 to a center point (e.g., geometric center point) of the second end 76. The axle shaft 70 may be radially symmetric about the central axis 72. Further, the axle shaft may be configured to rotate about the central axis 72. However, the seal 100 may be configured to remain rotationally stationary, with respect to the central axis 72. For example, the seal 100 may not rotate about the central axis 72.

The housing cover 90 may include a cover tube or channel 92 extending therethrough. The channel 92 is configured for fluid (e.g., lubricant, such as oil) to pass therealong, and thereby through the cover 90, from outside of the axle shaft assembly 50 to a space formed between the output shaft 60 and the axle shaft 70 (e.g., into the portion of the void 62 not occupied by axle shaft 70). The fluid may also pass through the seal 100, as will be discussed further herein. The fluid may be a lubricant that is transferred through void 62 to lubricate a differential assembly 95 and adjacent bearings, such as a first bearing 96a and a second bearing 96b, that are disposed between the differential assembly 95 and the output shaft 60. Accordingly, aspects of the present disclosure may be advantageous for allowing for fluid to easily flow between moving components.

To assemble the axle shaft assembly 50, the seal 100, which is coupled to the guard 80, may be pressed into the cover 90. Additionally, or alternatively, in some examples, including the illustrated embodiment, the seal 100 may be bonded or otherwise coupled to the cover 90 to permanently secure the seal 100 to the cover 90. Other methods of fixation may also be used, for example, fasteners, adhesive, welding, etc. The axle shaft 70 may further be inserted into the void 62 of the output shaft 60. Once installed, the seal 100 may be in contact with the output shaft 60 and the axle shaft 70. In some examples, a removable stabilizing piece 82 may be inserted between the seal 100 and the cover 90 to stabilize the seal 100 during operation of the axle shaft assembly 50.

The axle shaft 60 may be generally cylindrical. However, the axle shaft 60 may include eccentricities relative to other components during use. For example, the axle shaft 60 may include eccentricities from manufacturing tolerances, deformation as a result of applied forces or loads, etc. Some examples of seals described herein may be configured to seal lubricant between moving parts (e.g., an axle shaft and an output shaft), even with substantially eccentricities of axle shafts.

Figure 2:
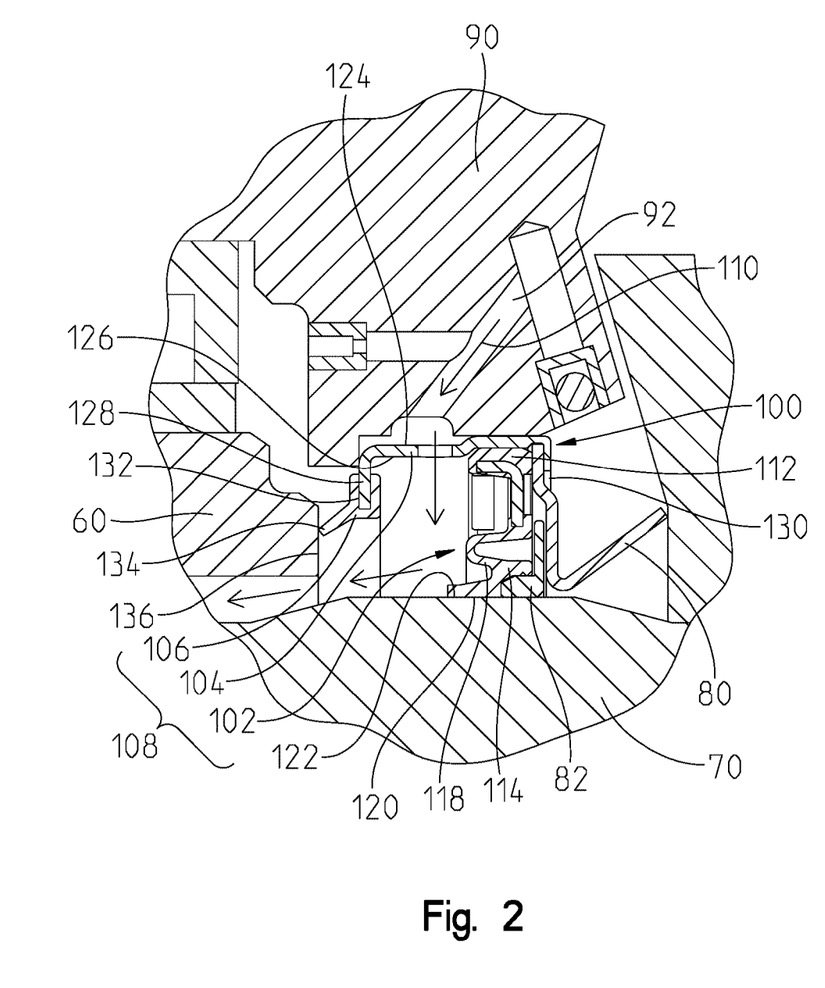
FIG. 2 illustrates an enlarged front cross-sectional elevation view of a portion of the axle shaft assembly of FIG. 1.
Figure 3:
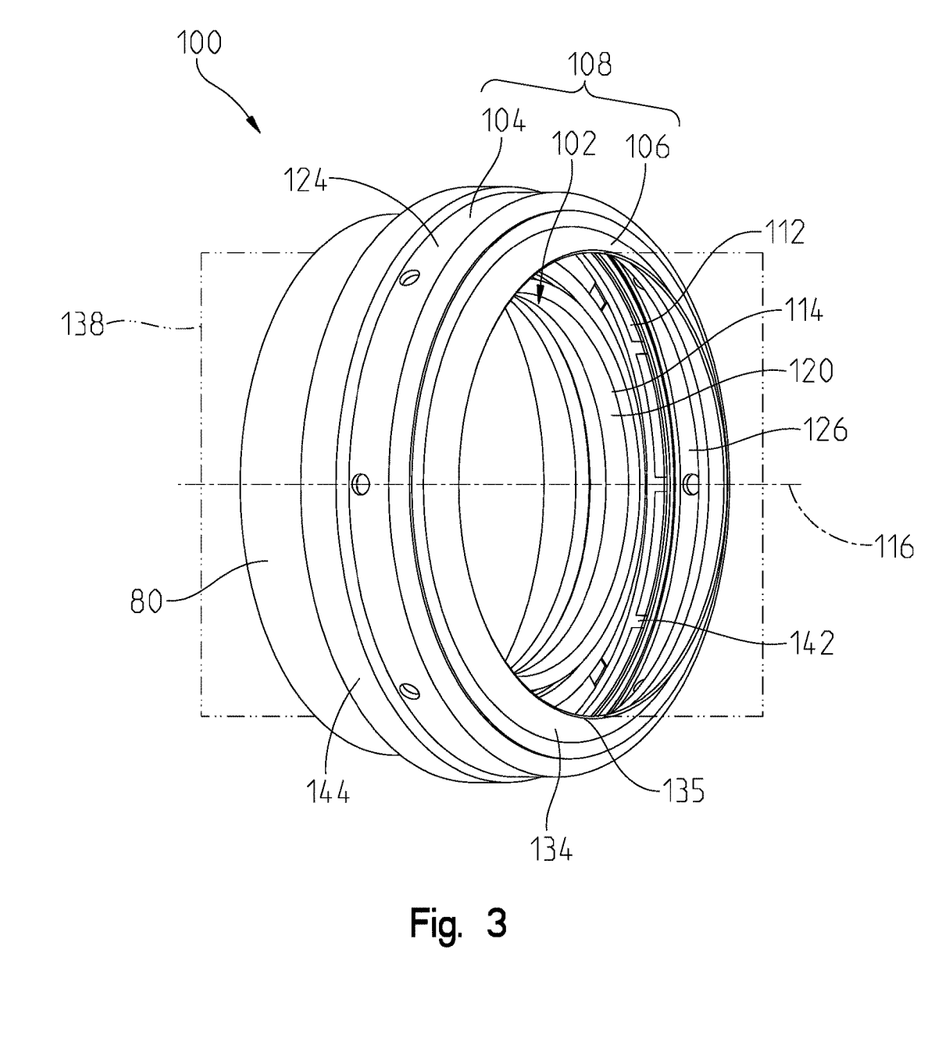
FIG. 3 illustrates a top, front, and right isometric view of a seal, according to some aspects described herein.

FIG. 2 illustrates an enlarged front cross-sectional view of a portion of the axle shaft assembly 50 of FIG. 1. Specifically, FIG. 2 illustrates an enlarged view of the seal 100 in contact with the output shaft 60, the axle shaft 70, the shaft guard 80, and the cover 90.

The seal 100 includes a first component 102, a second component 104, and a third component 106 that are assembled together to form a seal body 108. In some examples, the first component 102, the second component 104, and the third component 106 are formed together (e.g., they are part of a single, unitary and monolithic single piece) using molding, casting, forging, bonding or additive manufacturing techniques, such as 3D printing. Alternatively, in some embodiments, the first component 102, the second component 104, and the third component 106 are coupled together, such as, for example, via fasteners, welding, adhesive, or any other form of coupling.

A flow 110 of fluid may travel through the channel 92 of the cover, through the second component 104 of the seal body 108, and into the void between the axle shaft 70 and the output shaft 60. Conventional seals may not allow fluid to pass therethrough, as such an ability may in fact contradict the purpose of many seals. However, mechanisms disclosed herein allow for fluid to be passed through seal 100, while also capturing the fluid between and among moving components, even despite, in some instances, substantial deflection of the moving components.

The flow 110 may be a flow of a lubricant, such as oil. Alternatively, the flow 110 may be a flow of another type of fluid, such as a water-based fluid or a silicon-based fluid. As shown in FIG. 2, aspects described herein may allow for the flow 110 to change from a first direction (e.g., a substantially radial direction relative to axis 72) to a second direction (e.g., a substantially axial direction relative to axis 72). The first or initial direction of travel for the flow 110 (e.g., through the seal body 108) may be substantially orthogonal to the second or subsequent direction of travel for the flow 110 (e.g., along the outer surface of the axle shaft 70).

Figure 9:
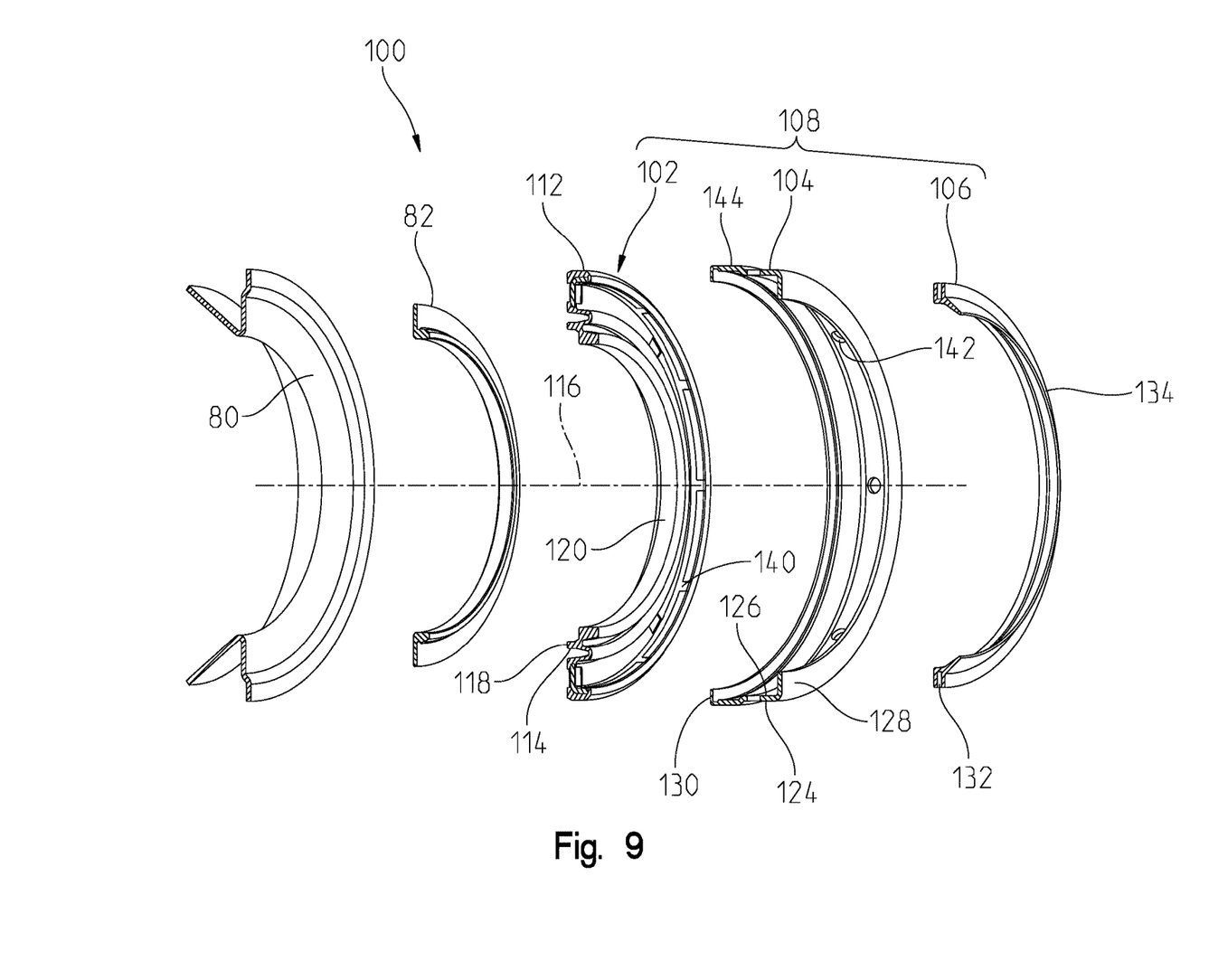
FIG. 9 illustrates a perspective exploded cross-sectional view of the seal of FIG. 3, according to some aspects described herein.

The first component 102 may be generally annular as shown, e.g., in FIG. 9. The first component 102 includes a collar 112 and a first dynamic flange 114. The first dynamic flange 114 may extend radially from the collar 112 to the center of gravity of the collar 112. Additionally, or alternatively, the first dynamic flange 114 may extend radially from the collar 112 to an axis of rotation 116. The axis of rotation 116 is described further herein with respect to FIGS. 3-6. The first dynamic flange 114 may protrude outward from the seal body 108 toward the axis of rotation 116. Further, the first dynamic flange 114 may include one or more folds 118 that form an accordion fold.

A face 120 of the first dynamic flange 114 may form an annular surface 122 configured to abut and bear against the axle shaft 70 when assembled therewith. The set of planes tangent to annular surface 122 are all substantially parallel to axis 72. The first dynamic flange 114 may be configured to dynamically, elastically deflect and fold during deflections of the axle shaft 70 without compromising the fluid-tight seal formed by annular surface 122. For example, the axle shaft 70 may apply force to the face 120 at the annular surface 122 that causes the first dynamic flange 114 to compress (e.g., fold, such that a distance between one or more of the one or more folds 118 is reduced). Due to deflections of the shaft 70, there may be moments in which at least a portion of the first dynamic flange 114 may extend (e.g., unfold, such that a distance between one or more of the one or more folds 118 is increased).

The second component 104 may be generally annular as shown, e.g., in FIG. 9. The second component 104 includes an outer circumferential surface 124, an opposing inner circumferential surface 126, a first rim 128, and an opposing second rim 130. The first rim 128 and the second rim 130 may extend fully, partially, or intermittently around the second component 104 (e.g., with respect to the axis of rotation 116). The first and second rims 128, 130 may extend from opposing sides of both of the outer and inner circumferential surfaces 124, 126, such that the first and second rims 128, 130 are laterally opposed across the second component 104, as shown.

The third component 106 may be generally annular as shown, e.g., in FIG. 9. The third component 106 includes a notch 132 that may open away from the axis of rotation 116. The third component 106 may further include a second dynamic flange 134 that extends radially and axially away from the notch 132.

The second dynamic flange 134 may protrude outward from the seal body 108. Specifically, the second dynamic flange 134 may extend away from an opening of the notch 132 and/or toward the axis of rotation 116. A face 135 of the second dynamic flange 134 may form a second plane 136 (FIG. 2) shared by an axial end of the output shaft 60, such that the second dynamic flange 134 bears against the generally planar surface of the output shaft when assembled therewith.

The tangent planes 137 defined by annular surface 122 may be substantially orthogonal to the second plane 136, and a first or center plane 138. The center plane 138, which may be one of a set of center planes 138, is described further below with respect to FIGS. 3-6. The orthogonality of the tangent planes 137 defined by annular surface 122 and the second plane 136 may allow for the seal 100 to dynamically interface between two moving elements (e.g., elements that may rotate, translate, or deflect, such as the output shaft 60 and the axle shaft 70). Further, the orthogonality of the tangent planes 137 defined by annular surface 122 and the second plane 136 may allow for a flow (e.g., the flow 110) of lubricant to change from a first direction (e.g., a radial direction) to a second direction (e.g., an axial direction).

FIGS. 3-6 further illustrate the seal 100. The seal body 108 defines the axis of rotation 116, with respect to which a number of components earlier herein have been described. The seal 100 may be radially symmetric about the axis of rotation 116. Further, the axis of rotation may extend through the center of mass of the seal 100, without contacting any portion of the seal 100. In some examples, when assembled, the axis of rotation 112 may be colinear with the central axis 72 of the axle shaft. The set of center planes 138, mentioned earlier herein, may be parallel to and coincident with the axis of rotation 116. A center plane from the set of center planes 138 may be the plane along which the cross sectional view of one or more of FIGS. 1, 2, 7, 8, and 9 are taken. Further, the seal 100 may be symmetric about any given one of the set of center planes 138.

In some examples, the first component 102 may include one or more ribs 140 (FIG. 9) to provide structural support for the collar 112 and/or the first dynamic flange 114. The one or more ribs 140 may each extend axially across the collar 112, with respect to the axis of rotation 116. Further, the placement of the one or more ribs 140 may be radially symmetric about the axis of rotation 116. The one or more ribs 140 may be a plurality of ribs.

In some examples, the second component 104 includes one or more holes 142 extending therethrough. The one or more holes 142 may be a plurality of holes. The one or more holes 142 extend from the outer circumferential surface 124 to the inner circumferential surface 126. Therefore, the one or more holes 142 extend through the seal body 108, such that the seal body 108 forms a conduit for fluid to pass therethrough, via the one or more holes 142. As noted above, the fluid that passes through the seal body 108 may be a lubricant, such as oil, that helps to lubricate the differential assembly 95 and adjacent bearings 96a, 96b.

While the illustrated example seal 100 includes eight holes 142, it should be recognized by those of ordinary skill in the art that there may be any number of holes 142, such as, for example, two holes, four holes, eight holes, ten holes, twelve holes, sixteen holes, etc. The number and/or dimensions of the holes 142 may correspond to an amount of lubricant that is desired to pass through the seal body 108 for a given hole size. For example, a relatively larger number of holes and/or relatively larger sized holes may allow for a relatively larger amount of lubricant to pass through the seal body 108 to lubricate moving parts. Further, a placement of the holes 142, along the second component 104, may be radially symmetric about the axis of rotation 116.

Figure 4:
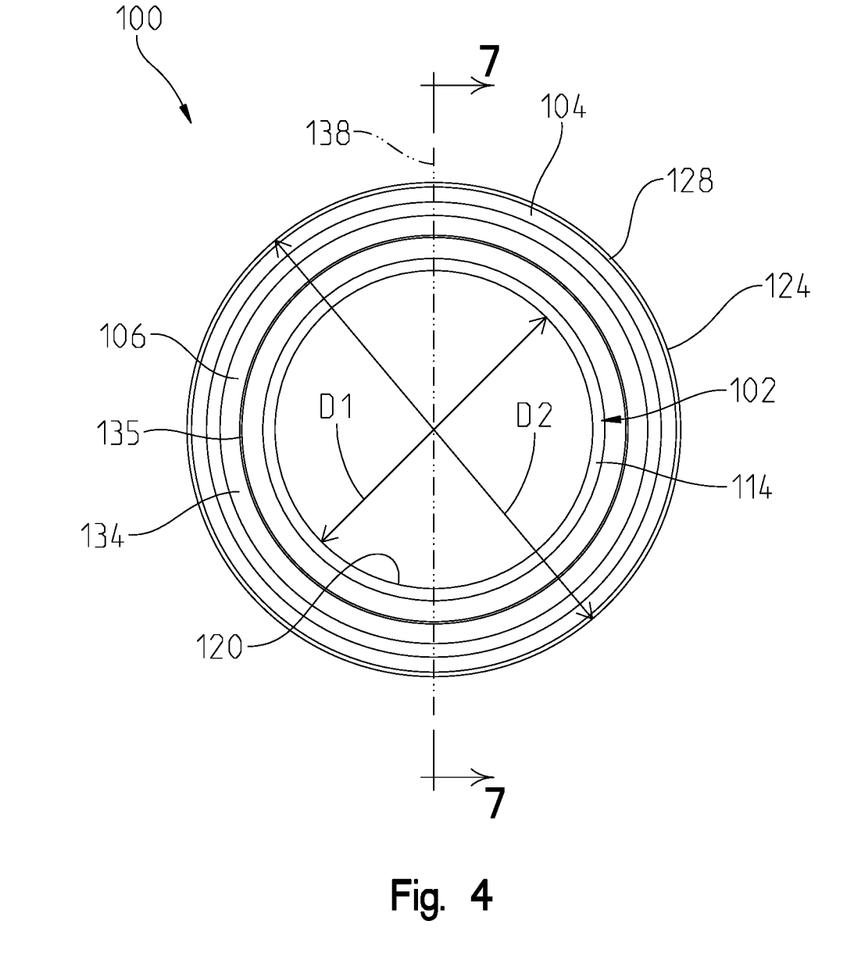
FIG. 4 illustrates a right side elevation view of a seal, according to some aspects described herein.
Figure 5:
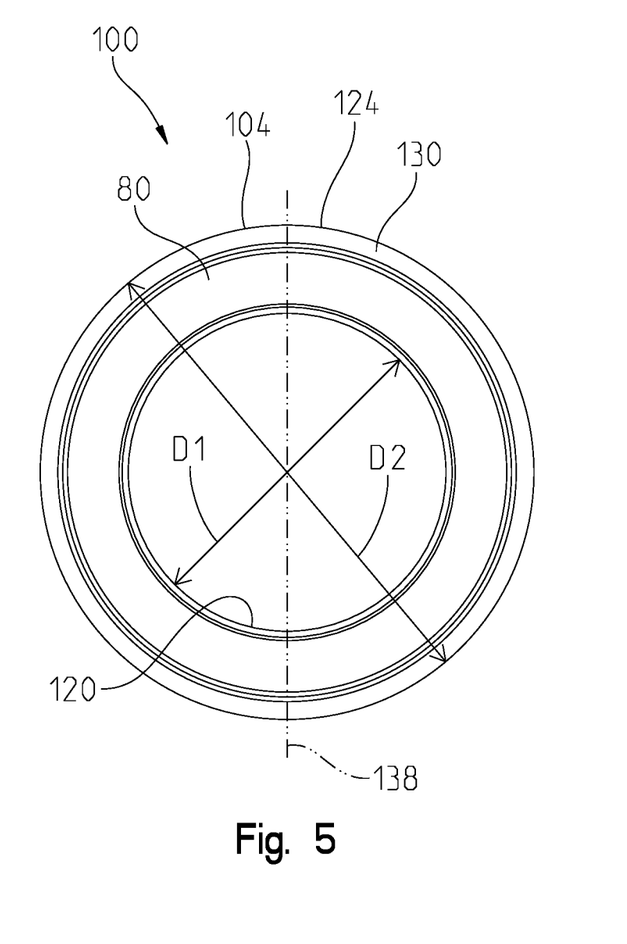
FIG. 5 illustrates a left side elevation view of a seal, according to some aspects described herein.
Figure 6:
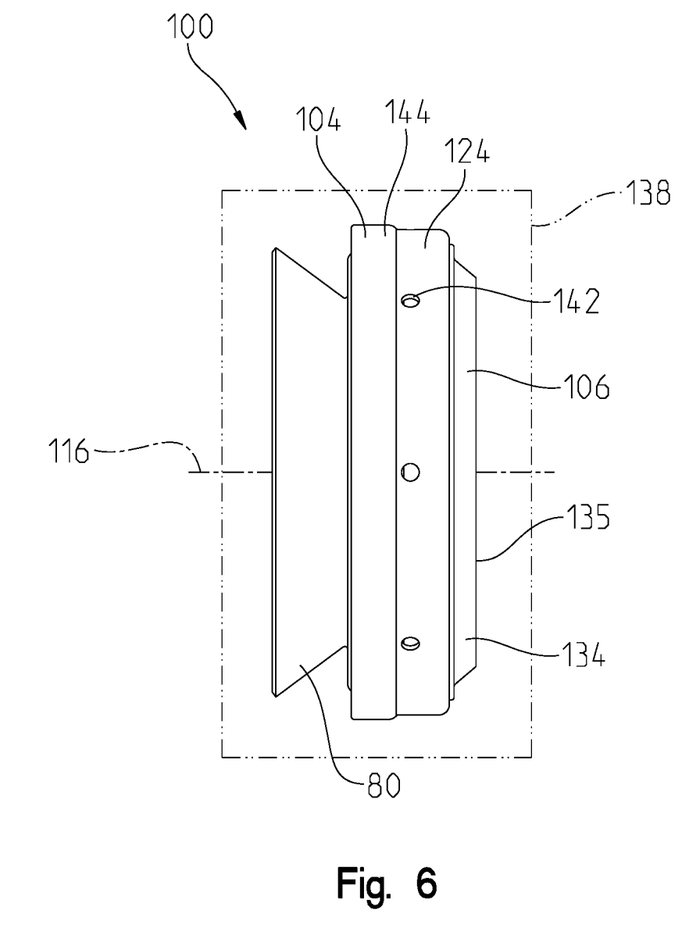
FIG. 6 illustrates a front elevation view of a seal, according to some aspects described herein.

Referring specifically to FIGS. 4 and 5, the seal 100 defines a first or inner diameter D1 and a second or outer diameter D2. The outer diameter D2 is defined by the outer circumferential surface 124 of the second component 104 of the seal 100. The inner diameter D1 is defined by the face 120 of the first dynamic flange 114 of the first component 102 of the seal 100. In some examples, a first ratio or diameter ratio of the inner diameter D1 to the outer diameter D2 may be between about 0.50 and about 0.80. Alternatively, in some examples, the diameter ratio of the inner diameter D1 to the outer diameter D2 may be between about 0.60 and about 0.70. Alternatively, in some examples, the diameter ratio of the inner diameter D1 to the outer diameter D2 may be about 0.65. Generally, the diameter ratios disclosed herein may provide for a compact seal structure that may easily fit within larger assemblies (e.g., the axle shaft assembly 50) without significantly constraining the range of acceptable sizes and geometries of the other components. Further, the diameter ratios disclosed herein provide for a seal that is capable of acting as a conduit for sufficient fluid to pass therethrough, while also being durable enough to effectively act as a seal during deflection of moving components with which the seal 100 may be in contact (e.g., the output shaft 60 and/or the axle shaft 70).

Figures 7, 8:
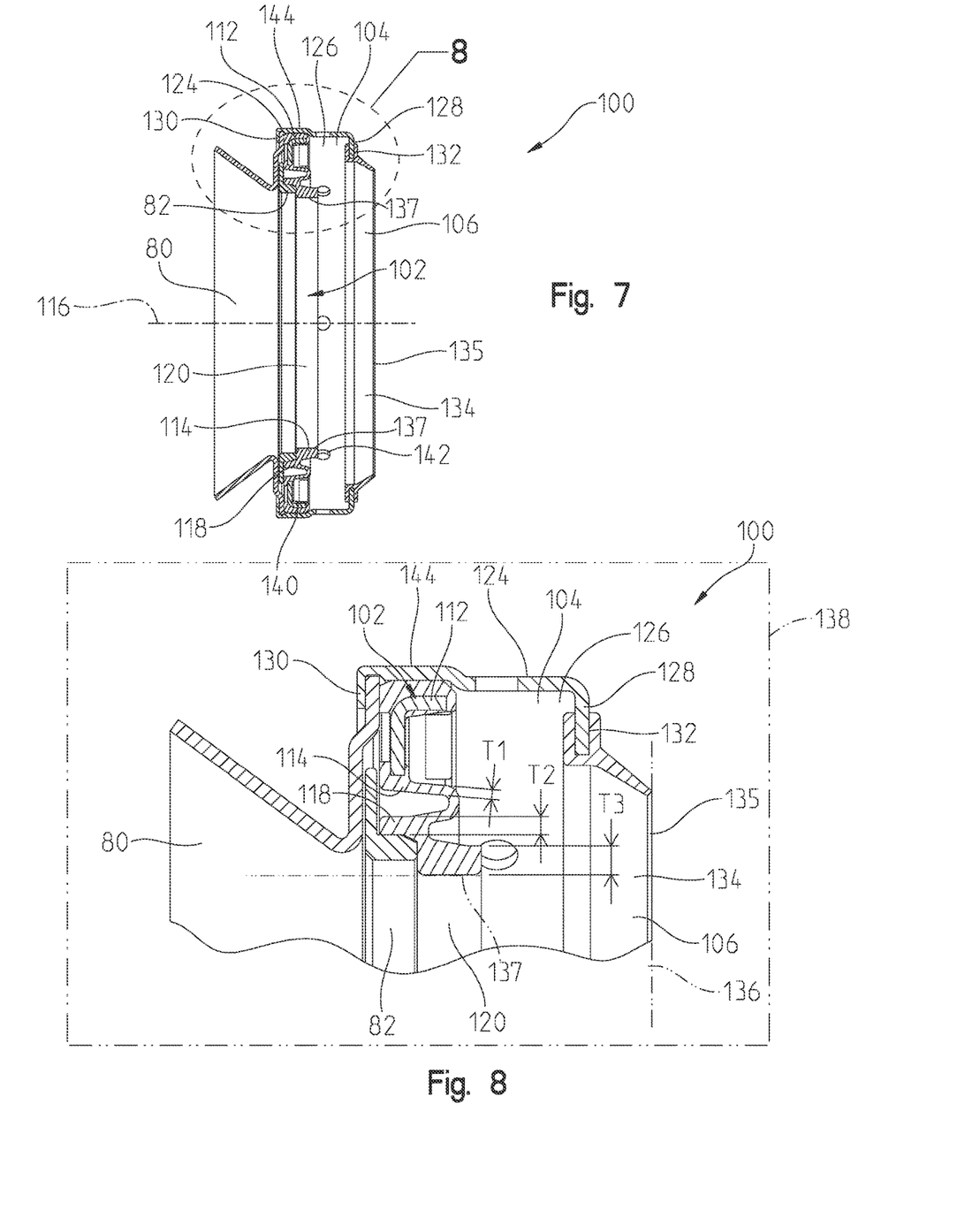
FIG. 7 illustrates a front cross-sectional elevation view of the seal of FIG. 6, taken along line 7-7 in FIG. 4.
FIG. 8 illustrates an enlarged front cross-sectional elevation view of a portion of the seal of FIG. 7.

FIGS. 7-9 further illustrate the seal 100. A step 144 may be formed by a bend of the outer and inner circumferential surfaces 124, 126. The step 144 may form a transition between a larger-diameter portion of second component 104 which is elevated away from the axis of rotation 116 with respect to a smaller-diameter portion of component 104 which forms the remainder of the outer and inner circumferential surfaces 124, 126. The step 144 may be formed within a minority of the outer and inner circumferential surfaces 124, 126.

In some applications, when assembling the axle shaft assembly 50, an installer may find that it is difficult to press fit the entire axial width of the seal 100 (e.g., as measured from the first rim 128 to the second rim 130, across the outer circumferential surface 124) into the cover 90. The step 144, decreases the surface area at which the seal 100 is press fit into the cover 90. Therefore, the step 144 may make it easier for the seal 100 to be initially press fit into the cover 90, and the larger portion of the step 144 is then engaged and press-fit to thereby contain the seal 100 at the proper position within the cover 90 and relative to the other components of the axle shaft assembly 50.

The notch 132 of the third component 106, discussed earlier herein with respect to FIGS. 2 and 9, may be configured (e.g., dimensioned, arranged, etc.) to receive the first rim 128 of the second component 104. Accordingly, in some examples, to assemble at least part of the seal body 108, the first rim 128 may be inserted into the notch 132 of the third component 106. Additionally, or alternatively, the third component 106 may be slidably, snappably, or otherwise removably attached to the second component 104, via the notch 132 and the first rim 128. In still other embodiments, the notch 132 and first rim 128 may be bonded, molded or otherwise permanently formed into a single component.

In some examples, the seal 100 may be a unitary component that is molded, printed, or otherwise manufactured. In other examples, such as the illustrated example of FIG. 9, the seal 100 may be an assembly that includes a plurality of components (e.g., the first component 102, the second component 104, and the third component 106, which are each separable components of the seal 100). Each of the plurality of components (e.g., the first, second, and third components 102, 104, 106) may be coupled together, such as, for example via couplings, welding, adhesives, or any other attachment mechanism known to those of ordinary skill in the art.

Referring specifically to FIG. 8, the one or more folds 118 of the first dynamic flange 114 may each define a thickness. For example, the first dynamic flange may include three folds that each define a respective first thickness T1, second thickness T2, and third thickness T3. The first thickness T1 may be a thickness of one or more of the one or more folds 118 that is furthest from the axis of rotation 116 and/or furthest from the face 120 of the first dynamic flange 114. The third thickness T3 may be closest to the axis of rotation 116 and/or closest to the face 120. The second thickness T2 may be the thickness of one of the one or more folds 118 that is disposed between the first thickness T1 and the second thickness T2 with respect to the axis of rotation 116 and/or the face 120. Each of the thicknesses T1, T2, and T3 may be measured in a center plane 138, as described above.

In some examples, the thickness T1 may be less than the thickness T2. Additionally, or alternatively, the thickness T2 may be less than the thickness T3. In some examples, a thickness ratio may be a ratio of the first thickness T1 to the third thickness T3. The thickness ratio may be between about 0.10 and about 0.70, or between about 0.20 and about 0.60, or between about 0.30 and about 0.50. Generally, the thickness ratios disclosed herein allow for a relatively larger and more durable fold to be in contact with a deflecting part (e.g., the axle shaft 70), while relatively less material may be used on folds that are further away from the deflecting part, and at which point forces applied by the deflecting part may, by then, be diminished.

Generally, the guard 80 may be coupled to the seal 100 to prevent dust or debris from contacting the seal 100. The 80 may be generally cone shaped. Specifically, the guard 80, when taken in cross section, such as within the center plane 138, may be generally V-shaped. The vertex of the V-shape may be adjacent to the axle shaft 70, when the guard 80 is assembled with the axle shaft 70. The guard 80 may be made from a metal material and generally configured to protect the softer portions of seal 100 from damage during installation and service.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A seal, the seal comprising:
   a body defining an axis of rotation, a first plane extending parallel to the axis of rotation, and coincident with the axis of rotation;
   a first dynamic flange protruding outward from the body, a face of the first dynamic flange forming an annular surface configured to abut against an axle shaft, when assembled therewith; and
   a second dynamic flange protruding outward from the body, a face of the second dynamic flange forming a second plane against an output shaft, when assembled therewith, the second plane intersecting the first plane, wherein tangent planes defined by the annular surface are substantially orthogonal to the second plane, and the first plane.

2. The seal of claim 1, wherein the first dynamic flange forms an accordion fold.

3. The seal of claim 1, wherein the body comprises an outer circumferential surface and an inner circumferential surface, and wherein one or more holes extend from the outer circumferential surface to the inner circumferential surface.

4. The seal of claim 3, wherein the one or more holes comprise a plurality of holes, and wherein the body forms a conduit for fluid to pass therethrough, via the plurality of holes.

5. The seal of claim 1, wherein the body includes a first component, a second component, and a third component that are coupled together.

6. The seal of claim 5, wherein the third component includes a notch that is configured to receive a rim of the second component.

7. The seal of claim 1, wherein the first dynamic flange includes a plurality of folds, and wherein a ratio of a thickness of a first fold to a thickness of a second fold is between about 0.10 and about 0.70, the thicknesses being measured radially with respect to the axis of rotation.

8. The seal of claim 1, wherein the body comprises an outer circumferential surface, and wherein the outer circumferential surface bends away from the axis of rotation to form a step.

9. A seal, the seal comprising:
   a body defining an axis of rotation, the body comprises an outer circumferential surface and an inner circumferential surface;
   a first dynamic flange protruding outward from the body; and
   a second dynamic flange protruding outward from the body,
   wherein one or more holes extend from the outer circumferential surface to the inner circumferential surface, whereby the body forms a conduit for fluid to pass therethrough, via the one or more holes.

10. The seal of claim 9, wherein the one or more holes comprise a plurality of holes.

11. The seal of claim 9, wherein the outer circumferential surface bends away from the axis of rotation to form a step.

12. The seal of claim 9, wherein the body includes a first component, a second component, and a third component that are coupled together.

13. The seal of claim 12, wherein the third component includes a notch that is configured to receive a rim of the second component.

14. The seal of claim 13, wherein the rim of the second component is a first rim, and the second component further comprises a second rim, the first and second rims being laterally opposed with respect to the inner and outer circumferential surfaces.

15. An axle shaft assembly, the assembly comprising:
    an output shaft, the output shaft forming a hole extending therethrough;
    an axle shaft, the axle shaft extending through the hole;
    a seal, the seal being in contact with the output shaft and the axle shaft, and the seal including one or more seal holes extending therethrough;
    a shaft guard, the shaft guard being in contact with the seal; and
    a housing cover, the housing cover being press fit against the seal and configured to hold the seal against the axle shaft, and the housing cover including a channel extending therethrough,
    wherein the channel and the one or more seal holes, in combination, form a conduit for fluid to pass therethrough.

16. The axle shaft assembly of claim 15, wherein the output shaft is configured to rotate about the axle shaft, wherein the axle shaft defines a central axis about which the axle shaft is configured to rotate, and wherein the seal is configured to remain rotationally stationary, with respect to the central axis.

17. The axle shaft assembly of claim 15, wherein the seal include a first dynamic flange that contacts the output shaft.

18. The axle shaft assembly of claim 17, wherein the seal further includes a second dynamic flange that contacts the axle shaft.

19. The axle shaft assembly of claim 17, wherein the first dynamic flange forms an accordion fold.

\* \* \* \* \*